United States Patent
Tseng et al.

(10) Patent No.: US 12,412,284 B2
(45) Date of Patent: Sep. 9, 2025

(54) IMAGE FUSION METHOD AND ELECTRONIC DEVICE

(71) Applicant: HON HAI PRECISION INDUSTRY CO., LTD., New Taipei (TW)

(72) Inventors: Te-En Tseng, New Taipei (TW); Tsai-Yi Chien, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 411 days.

(21) Appl. No.: 17/526,265

(22) Filed: Nov. 15, 2021

(65) Prior Publication Data

US 2022/0198685 A1    Jun. 23, 2022

(30) Foreign Application Priority Data

Dec. 22, 2020    (CN) .......................... 202011524963.3

(51) Int. Cl.
   *G06T 7/292*    (2017.01)
   *G06T 7/215*    (2017.01)
   *G06T 7/246*    (2017.01)

(52) U.S. Cl.
   CPC ............... *G06T 7/292* (2017.01); *G06T 7/215* (2017.01); *G06T 7/248* (2017.01);
   (Continued)

(58) Field of Classification Search
   CPC ......... G06T 7/292; G06T 7/215; G06T 7/248; G06T 2207/10016; G06T 2207/10048;
   (Continued)

(56) References Cited

U.S. PATENT DOCUMENTS

2018/0315174 A1*  11/2018  Staranowicz ............. G06T 5/70
2019/0098274 A1*   3/2019  Douady-Pleven ..... H04N 9/646
(Continued)

FOREIGN PATENT DOCUMENTS

CN    110706178    1/2020
CN    110766706    2/2020
(Continued)

OTHER PUBLICATIONS

Fusion of Infrared and Visible-Light Videos Using Motion-Compensated Temporal Sub-Band Decompositions, by Jonathan N. Gois, Eduardo A. B. da Silva, Carla L. Pagliari, Marcelo M. Perez, 2018 IEEE Winter Conference on Applications of Computer Vision: DOI 10.1109/WACV.2018.00016, 2018 (Year: 2018).*

(Continued)

*Primary Examiner* — Nay A Maung
*Assistant Examiner* — Heath E. Wells
(74) *Attorney, Agent, or Firm* — ScienBiziP, P.C.

(57) ABSTRACT

A method to fuse images to create temperature-based images with higher resolution and frame rate than those of a microbolometer controls a first camera device to capture a first video and controls an infrared camera device to capture a second video. Information as to objects in each frame of image in the first video is recognized, and the edge of an object in the image information is extracted. A thermal image corresponding to the first video is obtained from the second video, the thermal image being processed by an MEMC algorithm for motion estimation and compensation (prediction), to obtain an image free of misalignments and time displacements. A final fused image is obtained by (Continued)

fusing the defined-edges image, the thermal image, and the prediction image. An electronic device employing the method is also disclosed.

18 Claims, 2 Drawing Sheets

(52) U.S. Cl.
CPC ............... *G06T 2207/10016* (2013.01); *G06T 2207/10048* (2013.01); *G06T 2207/20221* (2013.01)

(58) Field of Classification Search
CPC ............. G06T 2207/20221; G06T 5/50; G06T 2207/10024; H04N 5/265; H04N 5/33; H04N 23/56; H04N 23/00; H04N 23/74; H04N 23/80
USPC ......................................................... 382/103
See application file for complete search history.

(56) References Cited

U.S. PATENT DOCUMENTS

| | | | | |
|---|---|---|---|---|
| 2019/0129162 | A1* | 5/2019 | Hodelin | ..................... F41G 1/38 |
| 2019/0387150 | A1* | 12/2019 | Iwakura | ................. H04N 23/71 |
| 2021/0019891 | A1* | 1/2021 | Yu | ........................... G06T 7/181 |
| 2021/0134251 | A1* | 5/2021 | Nakamura | ........... H04N 21/431 |
| 2021/0279530 | A1* | 9/2021 | Qu | ........................ G06V 10/143 |
| 2022/0114712 | A1* | 4/2022 | Wu | ........................ G06T 7/30 |
| 2022/0222795 | A1* | 7/2022 | Fan | ........................ H04N 25/60 |
| 2023/0214976 | A1* | 7/2023 | Wu | ........................... G06T 5/70 |
| | | | | 382/157 |

FOREIGN PATENT DOCUMENTS

| | | | | |
|---|---|---|---|---|
| CN | 110766706 A | * | 2/2020 | ............. G06T 5/005 |
| CN | 111225150 | | 6/2020 | |

OTHER PUBLICATIONS

Infrared and Visible Image Fusion through Details Preservation, by Yaochen Liu, Lili Dong, Yuanyuan Ji and Wenhai Xu, Sensors 2019, 19, 4556; doi:10.3390/s19204556, Oct. 20, 2019 (Year: 2019).*

Airborne Infrared and Visible Image Fusion Combined with Region Segmentation, by Yujia Zuo, Jinghong Liu, Guanbing Bai, Xuan Wang and Mingchao Sun, Sensors 2017, 17, 1127; doi:10.3390/s17051127, May 15, 2017 (Year: 2017).*

Jame W. Davis, Vinay Sharma, Background-subtraction using contour-based fusion of thermal and visible imagery, Computer Vision and Image Understanding 106 (2007) 162-182.

Liang Xu, Junping Du, Zhenhong Zhang, Infrared-visible video fusion based on motion-compensated wavelet transforms, IET Image Process., 2015, vol. 9, Iss. 4, pp. 318-328.

* cited by examiner

IMAGE FUSION METHOD AND ELECTRONIC DEVICE

FIELD

The present disclosure relates to a technical field of image processing, specifically an image fusion method and an electronic device.

BACKGROUND

Infrared microbolometer is limited by cost and other issues, and the frame rate cannot be easily increased, otherwise the cost will need to be greatly increased. Moreover, due to the large pixel size, it is difficult to achieve high resolution in use.

For mobile devices such as mobile phones or fixed image monitoring devices, due to their small size, infrared microbolometer does not meet its requirements for resolution and frame rate.

DETAILED DESCRIPTION

For clarity of the illustration of objectives, features, and advantages of the present disclosure, the drawings combined with the detailed description illustrate the embodiments of the present disclosure hereinafter. It is noted that embodiments of the present disclosure and features of the embodiments can be combined, when there is no conflict.

Various details are described in the following descriptions for a better understanding of the present disclosure, however, the present disclosure may also be implemented in other ways other than those described herein. The scope of the present disclosure is not to be limited by the specific embodiments disclosed below.

Unless defined otherwise, all technical and scientific terms used herein have the same meaning as commonly understood by one of ordinary skill in the art to which the present disclosure belongs. The terms used herein in the present disclosure are only for the purpose of describing specific embodiments and are not intended to limit the present disclosure.

Optionally, the image fusion method of the present disclosure is applied to one or more electronic devices. The electronic device includes hardware such as, but not limited to, a microprocessor and an Application Specific Integrated Circuit (ASIC), Field-Programmable Gate Array (FPGA), Digital Signal Processor (DSP), embedded devices, etc.

The electronic device may be a device such as a desktop computer, a notebook, a palmtop computer, or a cloud server. The computer device can interact with users through a keyboard, a mouse, a remote control, a touch panel, or a voice control device.

The electronic device communicates with a first camera device and an infrared camera device.

Figure 1:
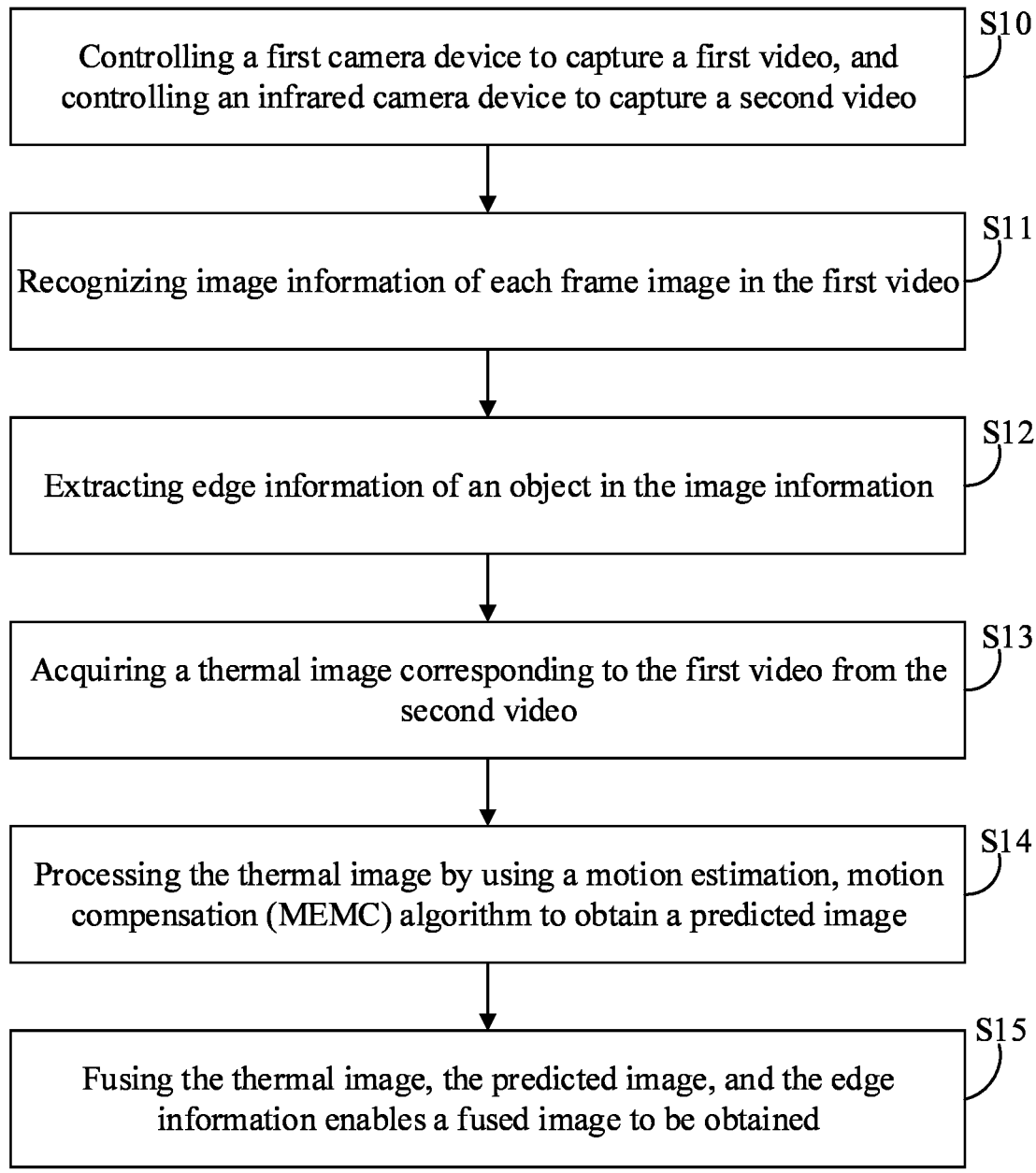
FIG. 1 shows a flowchart of an image fusion method provided in an embodiment of the present disclosure.

FIG. 1 is a flowchart of an image fusion method in an embodiment of the present disclosure. According to different needs, the order of the steps of the method in the flowchart can be changed, and some can be omitted.

In step S10 of the method, controlling a first camera device to capture a first video, and controlling an infrared camera device to capture a second video.

The first camera device can be an regular camera, capable of capturing visible light video, near-infrared video, and the like.

For example, wherein controlling the first camera device to capture the first video includes: detecting brightness value of the environment; when the brightness value is greater than a preset brightness threshold, controlling the first camera device to capture a visible light video and/or a near-infrared video as being the first video; when the brightness value is lower than or equal to the preset brightness threshold, activating a lighting device and controlling the first camera device to capture a near-infrared video as being the first video.

The preset brightness threshold can be adjusted. When the brightness value is greater than the preset brightness threshold, it indicates that the environment has sufficient light; when the brightness value is lower than or equal to the preset brightness threshold, it indicates that the environment is dimly lit.

Through the processes of the above embodiments, whether the light is sufficiently bright or not, an effective basis can be provided for subsequent edge detection.

The lighting device can include, but is not limited to, a light-emitting diode (LED) device, a laser near-infrared light source, and the like.

In some embodiments, wherein controlling the infrared camera device to capture the second video includes: controlling the infrared camera device to capture a long-range infrared video as being the second video.

A pixel size of the traditional microbolometer is relatively large, and it is difficult to achieve high resolution for small mobile devices such as mobile phones. By combining the high resolution of the first video with temperature-sensing of the second video, high resolution of the fusion of images can be achieved.

In step S11 of the method, recognizing image information of each frame image in the first video.

In some embodiments, the image information within the image can include, but is not limited to, one of or a combination of: color feature information, texture feature information, shape feature information, and spatial relationship feature information, etc.

In step S12 of the method, extracting edge information of an object in the image information.

In at least one embodiment of the present disclosure, wherein extracting edge information of an object in the image information includes: using an image signal processing algorithm to extract the edge information of the object in the image information.

The edge information includes contour lines of the object in the image.

Through the above embodiments, edge detection is performed in combination with information in images taken by a regular camera, which can facilitate subsequent fusion.

In step S13 of the method, acquiring a thermal image corresponding to the first video from the second video.

In at least one embodiment of the present disclosure, wherein acquiring the thermal image corresponding to the first video from the second video includes: determining time to capture the first video and extracting an image matching the time from the second video as being a thermal image corresponding to the first video.

Through the above embodiment, a thermal image being extracted from the second video according to the time to capture the first video ensures that the extracted image belongs to the same capture time as being the first video, and avoids deviations and non-alignments during subsequent image fusion.

In step S14 of the method, processing the thermal image by using a motion estimation, motion compensation (MEMC) algorithm to obtain a predicted image.

In at least one embodiment of the present disclosure, wherein processing the thermal image by using the MEMC algorithm to obtain the predicted image includes: estimating motion of an object in the thermal image by using the MEMC algorithm to obtain a predicted trajectory of the object and performing motion compensation on the thermal image according to the predicted trajectory to obtain the predicted image.

Through the above embodiment, combining with the MEMC algorithm to perform motion estimation and motion compensation on the thermal image increases a frame rate of the thermal image, the video display is smoother, and a higher rate of frame images can be output.

In step S15 of the method, fusing the thermal image, the predicted image, and the edge information enables a fused image to be obtained.

The predicted image is a thermal image and has no obvious edge features. In the above embodiment, the thermal image, the predicted image, and the edge information are fused, and the obtained fused image will have obvious edge features. That is, a high-resolution fused image is obtained.

A target video obtained by the above-mentioned embodiment combines visible light or near-infrared image and thermal image, which not only has high resolution, but also has a high frame rate.

The above-mentioned image fusion method can be applied to discover leaks of hot and cold water pipes, circuit short circuit detection, body temperature sensing for preventive medicine, etc. It can also replace the depth-of-field camera of mobile devices such as mobile phones to directly detect the body heat of humans and animals, and can realize blurring of the background of character, etc.

The image fusion method can control the first camera device to capture the first video, and control the infrared camera device to capture the second video. The image information of each frame image in the first video is recognized, and the edge information of an object in the image information is extracted, the thermal image corresponding to the first video is obtained from the second video, the thermal image is processed by using the MEMC algorithm to obtain a predicted image, and the motion estimation and motion compensation of the thermal image are combined with the MEMC algorithm. The frame rate of the thermal image is improved, and the obtained video is smoother, so that a higher rate of frame images is finally output. The thermal image, the predicted image and the edge information are fused to obtain a fused image, the fused image has well-defined edge features, that is, a fused image with high resolution and high frame rate will be obtained.

Figure 2:
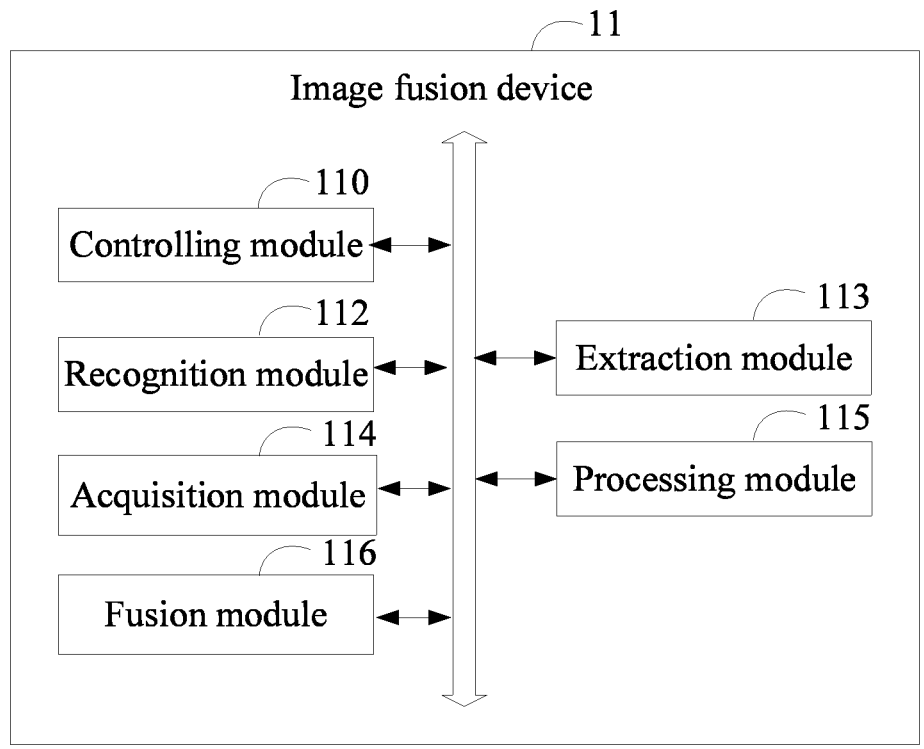
FIG. 2 shows a schematic structural diagram of an image fusion device provided in an embodiment of the present disclosure.

FIG. 2 shows a schematic structural diagram of an image fusion device in an embodiment of the present disclosure.

In some embodiments, the image fusion device 11 runs on an electronic device. The image fusion device 11 can include a plurality of function modules consisting of program code segments. The program code of each program code segments in the image fusion device 11 can be stored in a memory and executed by at least one processor to perform images fusion (described in detail in FIG. 1).

As shown in FIG. 2, the image fusion device 11 can include: a controlling module 110, a recognition module 112, an extraction module 113, an acquisition module 114, a processing module 115, and a fusion module 116. As referred to in the present disclosure, "module" refers to a series of computer-readable instruction segments that can be executed by at least one processor and that are capable of performing fixed functions, which are stored in a memory. The functions of each module will be detailed.

The above-mentioned integrated module implemented in a form of software functional modules can be stored in a non-transitory readable storage medium. The above software function modules are stored in a storage medium and include several instructions for causing a client (which can be a personal computer, a dual-screen device, or a network device) or a processor to execute the method described in various embodiments in the present disclosure.

The controlling module 110 controls a first camera device to capture a first video and controls an infrared camera device to capture a second video.

The first camera device can be a regular camera, capable of capturing visible light video, near-infrared video, and the like.

For example, the controlling module 110 controlling the first camera device to capture the first video includes: detecting brightness value of the environment; when the brightness value is greater than a preset brightness threshold, controlling the first camera device to capture a visible light video and/or a near-infrared video as being the first video; when the brightness value is lower than or equal to the preset brightness threshold, activating a lighting device and controlling the first camera device to capture a near-infrared video as being the first video.

The preset brightness threshold can be adjusted. When the brightness value is greater than the preset brightness threshold, it indicates that the environment has sufficient light; when the brightness value is lower than or equal to the preset brightness threshold, it indicates that the environment is dimly lit.

Through the processes of the above embodiments, whether the light is sufficiently bright or not, an effective basis can be provided for subsequent edge detection.

The lighting device can include but is not limited to a light-emitting diode (LED) device, a laser near-infrared light source, and the like.

In some embodiments, the controlling module 110 controlling the infrared camera device to capture the second video includes: controlling the infrared camera device to capture a long-range infrared video as being the second video.

A pixel size of the traditional microbolometer is relatively large, and it is difficult to achieve high resolution for small mobile devices such as mobile phones. By combining the high resolution of the first video with temperature-sensing of the second video, high resolution of the fusion of images can be achieved.

The recognition module 112 recognizes image information of each frame image in the first video.

In some embodiments, the image information within the image can include, but is not limited to, one of or a combination of: color feature information, texture feature information, shape feature information, and spatial relationship feature information, etc.

The extraction module 113 extracts edge information of an object in the image information.

In at least one embodiment of the present disclosure, the extraction module 113 extracting edge information of an object in the image information includes: using an image signal processing algorithm to extract the edge information of the object in the image.

The edge information includes contour lines of the object in the image.

Through the above embodiments, edge detection is performed in combination with information in images taken by a regular camera, which can facilitate subsequent fusion.

The acquisition module 114 acquires a thermal image corresponding to the first video from the second video.

In at least one embodiment of the present disclosure, the acquisition module 114 acquiring the thermal image corresponding to the first video from the second video includes: determining time to capture the first video; extracting an image matching the time from the second video as being a thermal image corresponding to the first video.

Through the above embodiment, a thermal image being extracted from the second video according to the time to capture the first video ensures that the extracted image belongs to the same capture time as being the first video, and avoids deviations and non-alignments during subsequent image fusion.

The processing module 115 processes the thermal image by using a motion estimation, motion compensation (MEMC) to obtain a predicted image.

In at least one embodiment of the present disclosure, the processing module 115 processing the thermal image by using the MEMC algorithm to obtain the predicted image includes: estimating motion of an object in the thermal image by using the MEMC algorithm to obtain a predicted trajectory of the object in the thermal image; and performing motion compensation on the thermal image according to the predicted trajectory to obtain the predicted image.

Through the above embodiment, combining with the MEMC algorithm to perform motion estimation and motion compensation on the thermal image increases a frame rate of the thermal image, the video display is smoother, and a higher rate of frame images can be output.

The fusion module 116 fuses the thermal image, the predicted image, and the edge information enables a fused image to be obtained.

The predicted image is a thermal image and has no obvious edge features. In the above embodiment, the thermal image, the predicted image, and the edge information are fused, and the obtained fused image will have obvious edge features. That is, a high-resolution fused image is obtained.

A target video obtained by the above-mentioned embodiment combines visible light or near-infrared image and thermal image, which not only has high resolution, but also has a high frame rate.

The above-mentioned image fusion method can be applied to discover leaks of hot and cold water pipes, circuit short circuit detection, body temperature sensing for preventive medicine, etc. It can also replace the depth-of-field camera of mobile devices such as mobile phones to directly detect the body heat of humans and animals, and can realize blurring of the background of character, etc.

The image fusion method can control the first camera device to capture the first video and control the infrared camera device to capture the second video. The image information of each frame image in the first video is recognized, and the edge information of an object in the image information is extracted, the thermal image corresponding to the first video is obtained from the second video, the thermal image is processed by using the MEMC algorithm to obtain a predicted image, and the motion estimation and motion compensation of the thermal image are combined with the MEMC algorithm. The frame rate of the thermal image is improved, and the obtained video is smoother, so that a higher rate of frame images is finally output. The thermal image, the predicted image and the edge information are fused to obtain a fused image, the fused image has well-defined edge features, that is, a fused image with high resolution and high frame rate will be obtained.

The embodiment provides a non-transitory readable storage medium having computer-readable instructions stored on thereof. The computer-readable instructions are executed by a processor to implement the steps in the above-mentioned image fusion method, such as in steps S10-S15 shown in FIG. 1:

In step S10, controlling a first camera device to capture a first video, and controlling an infrared camera device to capture a second video;

In step S11, recognizing image information of each frame image in the first video;

In step S12, extracting edge information of an object in the image information;

In step S13, acquiring a thermal image corresponding to the first video from the second video;

In step S14, processing the thermal image by using a motion estimation, motion compensation (MEMC) algorithm to obtain a predicted image;

In step S15, fusing the thermal image, the predicted image, and the edge information enables a fused image to be obtained.

Or, the computer-readable instruction is executed by the processor to realize the functions of each module/unit in the above-mentioned device embodiments, such as the units 110, 112-116 in FIG. 2:

The controlling module 110 controls a first camera device to capture a first video and controls an infrared camera device to capture a second video;

The recognition module 112 recognizes image information of each frame image in the first video;

The extraction module 113 extracts edge information of an object in the image information;

The acquisition module 114 acquires a thermal image corresponding to the first video from the second video;

The processing module 115 processes the thermal image by using a motion estimation, motion compensation (MEMC) algorithm to obtain a predicted image;

The fusion module 116 fuses the thermal image, the predicted image, and the edge information enables a fused image to be obtained.

Figure 3:
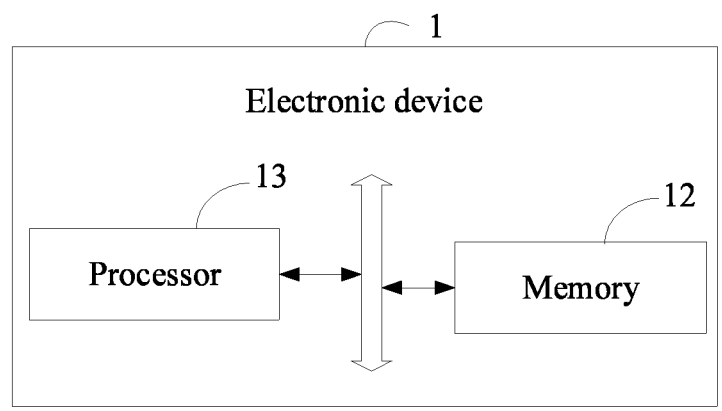
FIG. 3 shows a schematic structural diagram of an electronic device provided in an embodiment of the present disclosure.

FIG. 3 is a schematic structural diagram of an electronic device provided in Embodiment four of the present disclosure. The electronic device 1 may include: a memory 12, at least one processor 13, and computer-readable instructions stored in the memory 12 and executable on the at least one processor 13, for example, image recognition programs. The processor 13 executes the computer-readable instructions to implement the steps in the embodiment of the image fusion method, such as in steps S10-S15 shown in FIG. 1. Alternatively, the processor 13 executes the computer-readable instructions to implement the functions of the modules/units in the foregoing device embodiments, such as the units 110, 112-116 in FIG. 2.

Exemplarily, the computer-readable instructions can be divided into one or more modules/units, and the one or more modules/units are stored in the memory 12 and executed by the at least one processor 13. The one or more modules/units can be a series of computer-readable instruction segments capable of performing specific functions, and the instruction segments are used to describe execution processes of the computer-readable instructions in the electronic device 1. For example, The computer-readable instruction can be divided into the controlling module 110, the recognition module 112, the extraction module 113, the acquisition module 114, the processing module 115, and the fusion module 116 as in FIG. 2.

The electronic device 1 can be a desktop computer, a notebook, a palmtop computer, and a cloud server. Those skilled in the art will understand that the schematic diagram 3 is only an example of the electronic device 1 and does not constitute a limitation on the electronic device 1. Another electronic device 1 may include more or fewer components than shown in the figures or combine some components or have different components. For example, the electronic device 1 may further include an input/output device, a network access device, a bus, and the like.

The at least one processor 13 can be a central processing unit (CPU), or can be another general-purpose processor, digital signal processor (DSPs), application-specific integrated circuit (ASIC), Field-Programmable Gate Array (FPGA), another programmable logic device, discrete gate, transistor logic device, or discrete hardware component, etc. The processor 13 can be a microprocessor or any conventional processor. The processor 13 is a control center of the electronic device 1 and connects various parts of the entire electronic device 1 by using various interfaces and lines.

The memory 12 can be configured to store the computer-readable instructions and/or modules/units. The processor 13 may run or execute the computer-readable instructions and/or modules/units stored in the memory 12 and may call up data stored in the memory 12 to implement various functions of the electronic device 1. The memory 12 mainly includes a storage program area and a storage data area. The storage program area may store an operating system, and an application program required for at least one function (such as a sound playback function, an image playback function, etc.), etc. The storage data area may store data (such as audio data, a phone book, etc.) created according to the use of the electronic device 1. In addition, the memory 12 may include a high-speed random access memory, and may also include a non-transitory storage medium, such as a hard disk, an internal memory, a plug-in hard disk, a smart media card (SMC), a secure digital (SD) Card, a flashcard, at least one disk storage device, a flash memory device, or another non-transitory solid-state storage device.

When the modules/units integrated into the electronic device 1 are implemented in the form of software functional units having been sold or used as independent products, they can be stored in a non-transitory readable storage medium. Based on this understanding, all or part of the processes in the methods of the above embodiments implemented by the present disclosure can also be completed by related hardware instructed by computer-readable instructions. The computer-readable instructions can be stored in a non-transitory readable storage medium. The computer-readable instructions, when executed by the processor, may implement the steps of the foregoing method embodiments. The computer-readable instructions include computer-readable instruction codes, and the computer-readable instruction codes can be in a source code form, an object code form, an executable file, or some intermediate form. The non-transitory readable storage medium can include any entity or device capable of carrying the computer-readable instruction code, such as a recording medium, a U disk, a mobile hard disk, a magnetic disk, an optical disk, a computer memory, or a read-only memory (ROM).

In the several embodiments provided in the preset application, it should be understood that the disclosed electronic device and method can be implemented in other ways. For example, the embodiments of the devices described above are merely illustrative. For example, divisions of the units are only logical function divisions, and there can be other manners of division in actual implementation.

In addition, each functional unit in each embodiment of the present disclosure can be integrated into one processing unit, or can be physically present separately in each unit or two or more units can be integrated into one unit. The above modules can be implemented in a form of hardware or in a form of a software functional unit.

The present disclosure is not limited to the details of the above-described exemplary embodiments, and the present disclosure can be embodied in other specific forms without departing from the spirit or essential characteristics of the present disclosure. Therefore, the present embodiments are to be considered as illustrative and not restrictive, and the scope of the present disclosure is defined by the appended claims. All changes and variations in the meaning and scope of equivalent elements are included in the present disclosure. Any reference sign in the claims should not be construed as limiting the claim. Furthermore, the word "comprising" does not exclude other units nor does the singular exclude the plural. A plurality of units or devices stated in the system claims may also be implemented by one unit or device through software or hardware. Words such as "first" and "second" are used to indicate names, but not in any particular order.

Finally, the above embodiments are only used to illustrate technical solutions of the present disclosure and are not to be taken as restrictions on the technical solutions. Although the present disclosure has been described in detail with reference to the above embodiments, those skilled in the art should understand that the technical solutions described in one embodiment can be modified, or some of the technical features can be equivalently substituted, and that these modifications or substitutions are not to detract from the essence of the technical solutions or from the scope of the technical solutions of the embodiments of the present disclosure.

What is claimed is:

1. An image fusion method, the method comprising:
controlling a first camera device to capture a first video, comprising: detecting a brightness value of an environment; when the brightness value is greater than a preset brightness threshold, controlling the first camera device to capture a visible light video and/or a near-infrared video as being the first video, when the brightness value is lower than or equal to the preset brightness threshold, activating a lighting device and controlling the first camera device to capture a near-infrared video as being the first video;
controlling an infrared camera device to capture a second video;
recognizing image information of each frame image in the first video, the image information comprising: color feature information, texture feature information, shape feature information, and spatial relationship feature information;

extracting edge information of an object in the image information, the edge information comprising contour lines of the object in the image;

acquiring a thermal image corresponding to the first video from the second video;

processing the thermal image by using a motion estimation, motion compensation (MEMC) algorithm to obtain a predicted image; and fusing the thermal image, the predicted image, and the edge information enables a fused image to be obtained.

2. The image fusion method of claim 1, wherein controlling the infrared camera device to capture the second video comprises:

controlling the infrared camera device to capture a long-range infrared video as being the second video.

3. The image fusion method of claim 1, wherein extracting edge information of an object in the image information comprises:

using an image signal processing algorithm to extract the edge information of the object in the image information.

4. The image fusion method of claim 1, wherein acquiring the thermal image corresponding to the first video from the second video comprises:

determining time to capture the first video;

extracting an image matching the time from the second video as being a thermal image corresponding to the first video.

5. The image fusion method of claim 1, wherein processing the thermal image by using the MEMC algorithm to obtain the predicted image comprises:

estimating motion of an object in the thermal image by using the MEMC algorithm to obtain a predicted trajectory of the object in the thermal image;

performing motion compensation on the thermal image according to the predicted trajectory to obtain the predicted image.

6. An electronic device comprising a memory and a processor, the memory stores at least one computer-readable instruction, which when executed by the processor causes the processor to:

control a first camera device to capture a first video, comprising: detect a brightness value of an environment; when the brightness value is greater than a preset brightness threshold, control the first camera device to capture a visible light video and/or a near-infrared video as being the first video, when the brightness value is lower than or equal to the preset brightness threshold, activate a lighting device and control the first camera device to capture a near-infrared video as being the first video;

control an infrared camera device to capture a second video;

recognize image information of each frame image in the first video, the image information comprising: color feature information, texture feature information, shape feature information, and spatial relationship feature information;

extract edge information of an object in the image information, the edge information comprising contour lines of the object in the image;

acquire a thermal image corresponding to the first video from the second video;

process the thermal image by using a motion estimation, motion compensation (MEMC) algorithm to obtain a predicted image; and fuse the thermal image, the predicted image, and the edge information enables a fused image to be obtained.

7. The electronic device of claim 6, wherein the processor controls the infrared camera device to capture the second video by:

controlling the infrared camera device to capture a long-range infrared video as being the second video.

8. The electronic device of claim 6, wherein the processor extracts edge information of an object in the image information by:

using an image signal processing algorithm to extract the edge information of the object in the image information.

9. The electronic device of claim 6, wherein the processor acquires the thermal image corresponding to the first video from the second video by:

determining time to capture the first video;

extracting an image matching the time from the second video as being a thermal image corresponding to the first video.

10. The electronic device of claim 6, wherein the processor processes the thermal image by using the MEMC algorithm to obtain the predicted image by:

estimating motion of an object in the thermal image by using the MEMC algorithm to obtain a predicted trajectory of the object in the thermal image;

performing motion compensation on the thermal image according to the predicted trajectory to obtain the predicted image.

11. A non-transitory storage medium having stored thereon at least one computer-readable instructions that, when the at least one computer-readable instructions are executed by a processor to implement an image fusion method, which comprises:

controlling a first camera device to capture a first video, comprising: detecting a brightness value of an environment; when the brightness value is greater than a preset brightness threshold, controlling the first camera device to capture a visible light video and/or a near-infrared video as being the first video; when the brightness value is lower than or equal to the preset brightness threshold, activating a lighting device and controlling the first camera device to capture a near-infrared video as being the first video;

controlling an infrared camera device to capture a second video;

recognizing image information of each frame image in the first video, the image information comprising: color feature information, texture feature information, shape feature information, and spatial relationship feature information;

extracting edge information of an object in the image information, the edge information comprising contour lines of the object in the image;

acquiring a thermal image corresponding to the first video from the second video;

processing the thermal image by using a motion estimation, motion compensation (MEMC) algorithm to obtain a predicted image; and fusing the thermal image, the predicted image, and the edge information enables a fused image to be obtained.

12. The non-transitory storage medium of claim 11, wherein controlling the infrared camera device to capture the second video comprises:

controlling the infrared camera device to capture a long-range infrared video as being the second video.

13. The non-transitory storage medium of claim 11, wherein extracting edge information of an object in the image information comprises:
   using an image signal processing algorithm to extract the edge information of the object in the image information.

14. The non-transitory storage medium of claim 11, wherein acquiring the thermal image corresponding to the first video from the second video comprises:
   determining time to capture the first video;
   extracting an image matching the time from the second video as being a thermal image corresponding to the first video.

15. The non-transitory storage medium of claim 11, wherein processing the thermal image by using the MEMC algorithm to obtain the predicted image comprises:
   estimating motion of an object in the thermal image by using the MEMC algorithm to obtain a predicted trajectory of the object in the thermal image;
   performing motion compensation on the thermal image according to the predicted trajectory to obtain the predicted image.

16. The image fusion method of claim 1, wherein a resolution of the first video is greater than a resolution of the second video.

17. The electronic device of claim 6, wherein a resolution of the first video is greater than a resolution of the second video.

18. The non-transitory storage medium of claim 11, wherein a resolution of the first video is greater than a resolution of the second video.

* * * * *